United States Patent [19]

Zahn et al.

[11] 4,088,404
[45] May 9, 1978

[54] APPARATUS FOR APPLYING MARKERS TO WEBS OF PHOTOGRAPHIC MATERIAL IN COPYING MACHINES

[75] Inventors: Wolfgang Zahn, Munich; Erich Nagel, Anzig, both of Germany

[73] Assignee: Agfa-Gevaert Aktiengesellschaft, Leverkusen, Germany

[21] Appl. No.: 702,139

[22] Filed: Jul. 2, 1976

[30] Foreign Application Priority Data

Jul. 10, 1975 Germany .............................. 2530744

[51] Int. Cl.² ...................... G03B 29/00; G03B 27/52
[52] U.S. Cl. .......................................... 355/29; 355/40
[58] Field of Search .................... 355/112, 97, 77, 18, 355/29, 64, 50, 54, 40, 41

[56] References Cited
U.S. PATENT DOCUMENTS

| | | | |
|---|---|---|---|
| 3,718,807 | 2/1973 | Bracken et al. | 355/29 X |
| 3,807,855 | 4/1974 | Zajac | 355/29 |
| 3,811,768 | 5/1974 | Zahn et al. | 355/29 |
| 3,844,253 | 10/1974 | Staub | 355/29 |
| 3,898,002 | 8/1975 | Kinder et al. | 355/40 |

*Primary Examiner*—Donald A. Griffin
*Attorney, Agent, or Firm*—Peter K. Kontler

[57] ABSTRACT

A copying machine, especially a projection printer, wherein a web of photographic paper receives images of successive film frames on an original at an exposure station and the original is monitored by a scanning device which transmits electric signals in response to detection of indicia denoting the last frames of successive orders. The web is formed with first markers which denote successive images thereon and the locations where the web is to be severed to yield discrete prints, and with second markers each of which denotes the last print of an order. A means for applying first and second markers of a first type includes an exposure unit, and a means for applying first and second markers of a second type includes a stamping unit with two punches. Both units are mounted on a carriage which is movable longitudinally and transversely of the web to thereby place the selected unit in an optimum position for the application of markers of the first and second type in dependency on the selected format of prints. The signals which are furnished by the scanning device are transmitted to a mechanical storage which transmits the signals with a variable delay to that device of the selected unit which applies second markers. The extent to which the storage delays the transmission of signals depends on the selected format of prints.

19 Claims, 4 Drawing Figures

APPARATUS FOR APPLYING MARKERS TO WEBS OF PHOTOGRAPHIC MATERIAL IN COPYING MACHINES

BACKGROUND OF THE INVENTION

The present invention relates to copying machines in general, especially to projection printers, and more particularly to improvements in apparatus for applying markers to intermittently or continuously moving webs of photographic material in a copying machine. Still more particularly, the invention relates to improvements in apparatus which are utilized to apply markers denoting the locations where a web of photographic material must be severed to yield discrete prints as well as markers which denote the last print of a series of associated prints, especially the last print of a series or group of prints belonging to a given customer.

In accordance with a presently known technique, the copying machine comprises an apparatus for exposing suitable (readily detectable) markers onto the photosensitive layer of a photographic paper web. The markers are normally applied to one of the longitudinally extending marginal portions of the web, i.e., adjacent to one side of the row of exposed images on the photosensitive layer. When the web has been transported through the developing apparatus, it is severed at intervals in response to detection of successive markers so as to be converted into a series of discrete prints. The severing operation normally or often involves separation of that marginal portion which is provided with the markers. The markers are detected by a photoelectric scanning device which transmits signals to the severing device and to the means for transporting the web lengthwise. Reference may be had to German Offenlegungsschrift No. 2,141,950.

It is also known to provide a web of photographic material with markers in the form of slits, cutouts or notches, preferably slits which are formed in the frame lines between successive latent images on the web. As a rule, a slit is formed in the frame line behind the last exposed image, i.e., in the narrow space between the freshly exposed image and the area about to be exposed to light which passes through the next-following frame of an exposed and developed photographic film. The marker (preferably a slit) which denotes the last print of an order is also formed in a frame line adjacent to and in line with the slit which identifies an image. When the web has passed through the developing machine, the slits denoting successive images and the slits denoting the last prints of successive orders are detected by discrete photoelectric monitoring devices one of which transmits signals to the severing means and to the means for transporting the exposed and developed web, and the other of which transmits signals to suitable apparatus which assemble the prints of an order, introduce the assembled prints into envelopes, and insert into the envelopes the corresponding portions of photographic film so that the envelopes can be returned to the dealers (who accepted the orders from customers) or directly to the customers. The severing device is preferably designed to remove from the web narrow strips of photographic paper, and each such strip contains a marker (slit) which denotes the respective print, or a first marker which denotes the respective print and a second marker (slit) which denotes the last print of the respective order.

The making of slit-shaped markers in the frame lines rather than in the marginal portions of a photographic paper web is desirable and advantageous because the web is less likely to break (i.e., it is weakened to a lesser extent if the slits are remote from its marginal portions). On the other hand, the markers which are exposed onto the photosensitive layer of the web are preferably applied to one of the marginal portions because they can be readily removed by the simple expedient of severing or trimming the web in such a way that the respective marginal portion is separated from the prints. The making of exposed markers in the marginal portions of a web is desirable on the additional ground that it would be difficult or impossible to detect a marker which has been exposed into the frame line between two partially overlapping neighboring latent images. On the other hand, a marker in the form of a slit or cutout which is provided in the frame line between two neighboring images can be detected irrespective of whether or not such images overlap.

Markers in the form of exposed dots or other configurations in one marginal portion of the web are normally resorted to if the prints are provided with margins surrounding two or more sides of the image. Markers in the form of slits are preferred when the web is to be subdivided into margin-free prints. Such procedures are desirable in order to achieve savings in photographic paper. However, it is nevertheless desirable to design the marker applying apparatus of a photographic copying machine in such a way that markers in the form of exposed dots or other configurations on the photosensitive layer of the web can be applied to the frame lines between neighboring images. Such technique can be resorted to when the photoelectric or other monitoring means of the copying machine is designed or positioned to detect markers which are remote from the marginal portions of the web, i.e., which are provided in the frame lines.

As a rule, signals for the making of markers are electric signals which are produced at an appropriate time in the course of each copying cycle. The application of markers which denote successive prints presents no problems because such markers can be applied to the web during exposure of the corresponding film frames on the original. On the other hand, the application of markers which denote the last print of an order is more difficult, primarily because the monitoring device cannot or should not be placed into immediate proximity of the severing device. Thus, it happens frequently that the space which is available in a copying machine for the installation of monitoring device is remote from the severing device so that the monitoring device detects markers denoting the last prints of successive orders well ahead of the severing station. This means that the copying machine must be provided with a storage or time delay device which delays the transmission of signals denoting the last prints of successive orders for periods of time corresponding to those which are needed to actuate the severing device two, three, four or more times before the last print of an order is separated from the next-following portion of the web. In most instances, the storage includes an electrical or electronic time delay device. A drawback of such storages is that they fail to operate properly when the connection to the source of electrical energy is interrupted or in the event of malfunction, i.e., the signal which is to denote the last print of an order is likely to be lost or is generated prematurely or too late. This can result in a complete breakdown of the automatic print gathering and processing operation, i.e., the prints are not assembled into groups which belong to given customers so that the customers or dealers receive prints belonging to other customers or dealers.

OBJECTS AND SUMMARY OF THE INVENTION

An object of the invention is to provide a novel and improved apparatus for applying markers to webs of photographic paper or the like and to provide the apparatus with novel and improved means for insuring that all markers are applied at optimum locations, in proper sequence, and by resorting to simple, compact and inexpensive component parts.

Another object of the invention is to provide a versatile apparatus which can apply different types of markers and which can be readily converted from the application of one type of markers (e.g., markers which are exposed onto the frame lines or onto a marginal portion of a web of photographic paper) to the application of another type of markers (e.g., slits, cutouts or notches), always in dependency on the selected format of prints and on the nature of the severing device.

A further object of the invention is to provide an apparatus which can be installed in existing photographic copying machines as a superior (especially a more reliable and more versatile) substitute for existing apparatus.

An additional object of the invention is to provide a marker applying apparatus of the above outlined character with novel and improved means for storing certain signals, especially signals which are generated in response to detection of indicia denoting the last film frames of successive orders.

Still another object of the invention is to provide the apparatus with novel and improved means for applying markers in the form of slits, cutouts or notches, especially in the frame lines between successive prints.

The invention is embodied in a copying machine, particularly in a projection printer with spaced-apart paths for a web of photographic paper and original film, wherein a web of photographic material is moved along a predetermined path past an exposure station to be provided with latent images of portions (film frames) of a movable original, wherein such portions of the original form groups of successive portions belonging to different orders (e.g., one or more series of exposed films belonging to a given customer), and wherein the original is provided with indicia which denote the last portions of successive orders. In accordance with the invention, the copying machine comprises a versatile apparatus for applying to the web first markers which denote or identify successive images and the locations where the web is to be severed (subsequent to development of latent images) to yield discrete prints, and second markers which denote or identify the images corresponding to last portions of successive orders.

The apparatus comprises a mobile support (e.g., a wheel-mounted carriage) and first and second marker-applying units which are mounted on the support. The first unit has first and second devices for respectively applying first and second markers of a first type (such unit may include first and second devices which expose first and second markers along one marginal portion or at the frame lines on the photosensitive material of the web), and the second unit has first and second devices for applying first and second markers of a second type (the first and second devices of the second unit may include punches which remove material from the web). The support is adjustable relative to the path of movement of the web in accordance with the desired format of images on the web, and the apparatus further comprises means for rendering a selected unit operative for the application of first and second markers by the corresponding first and second devices of the selected unit, a photoelectric scanning device or other suitable means for monitoring the original for the presence of indicia and for producing and transmitting signals in response to detection of successive indicia, and a mechanical storage having means (e.g., reciprocable cams or trips which are caused to orbit in synchronism with operation of the copying machine) for storing the signals and means (e.g., normally open electric switches adjacent to the path of orbital movement of trips) for transmitting the stored signals to the second device of the selected marker-applying unit with a predetermined delay which depends on the selected format of prints.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
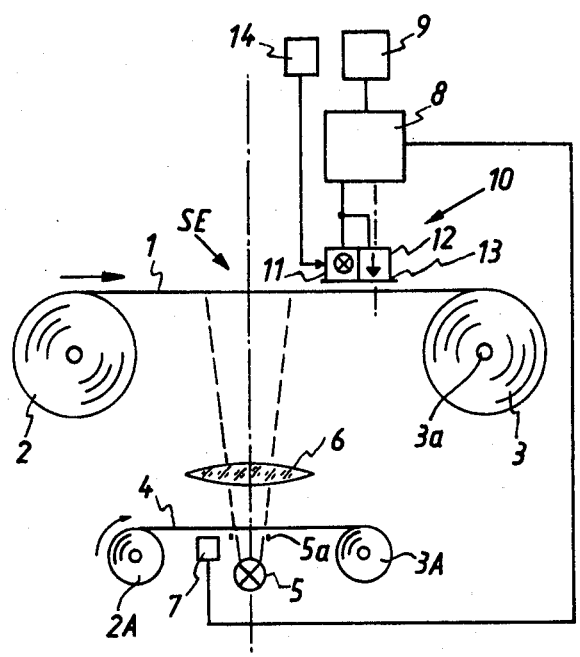
FIG. 1 is a schematic side elevational view of a photographic copying machine having an apparatus which embodies the invention.

Referring first to FIG. 1, there is shown a photographic copying machine wherein a web 1 of photographic paper is transported from the core of a supply reel 2 to the core of a takeup reel 3. All details of transporting means for moving the web 1 stepwise so as to place successive unexposed portions of photosensitive material thereon into register with successive frames of an elongated strip-shaped original 4 (e.g., an exposed and developed photographic film) are not shown in the drawing. The shaft 3a of the takeup reel 3 can constitute a component part of such transporting means. The original 4 is withdrawn from a supply reel 2A and is collected by a takeup reel 3A. That stretch of the web 1 which extends between the reels 2, 3 is parallel to the film portion between the reels 2A and 3A. The copying machine further comprises a light source 5 and an optical system 6 which projects the images of successive frames of the film 4 onto registering portions of photosensitive material on the web 1. The light which issues from the source 5 passes through a duct 5a before it passes through the registering portion of the film 4 and on toward the optical system 6. A scanning device 7 is mounted in the copying machine immediately upstream of the duct 5a and comprises means for detecting indicia (not shown) which are applied to the film 4 and denote the last frames of successive orders. The film 4 may constitute a very long strip which consists of several spliced-together films belonging to different customers. Such splicing of discrete films end-to-end is desirable for convenient transport of a long strip through the developing machine in a photographic processing laboratory. The signals which the scanning device 7 (e.g., a photoelectric cell) produces in response to detection of successive indicia are transmitted to a mechanical signal storing device 8 (hereinafter called storage) which is constructed and assembled in accordance with one feature of the invention and (together with the scanning device 7) forms part of the improved apparatus for the application of markers to the web 1. The storage 8 is associated with a format selector 9 which also forms part of the improved apparatus. The latter further comprises a carriage or support 13 for an assembly 10 of two different marker applying units 11 and 12. The carriage 13 is located downstream of a station SE where successive unexposed portions of photosensitive material on the web 1 are exposed to light passing through the optical system 6 of the copying machine. The arrangement is such that the unit (e.g, 11) which has been chosen for the application of markers to the web 1 applies markers at a distance of one image or print from the exposure station ES, i.e., at a distance which is equal to the length of one print from the right-hand edge of the platform for the web 1 at the station ES. The unit 11 is designed to expose markers onto the photosensitive material of the web 1, and the unit 12 is designed to remove portions of the web 1, i.e., to form slits, recesses, cutouts or notches in the material of the web 1 whereby the resulting openings constitute markers which can be detected by the monitoring means of the copying machine to control the operation of severing and transporting means for the web 1.

Figure 2:
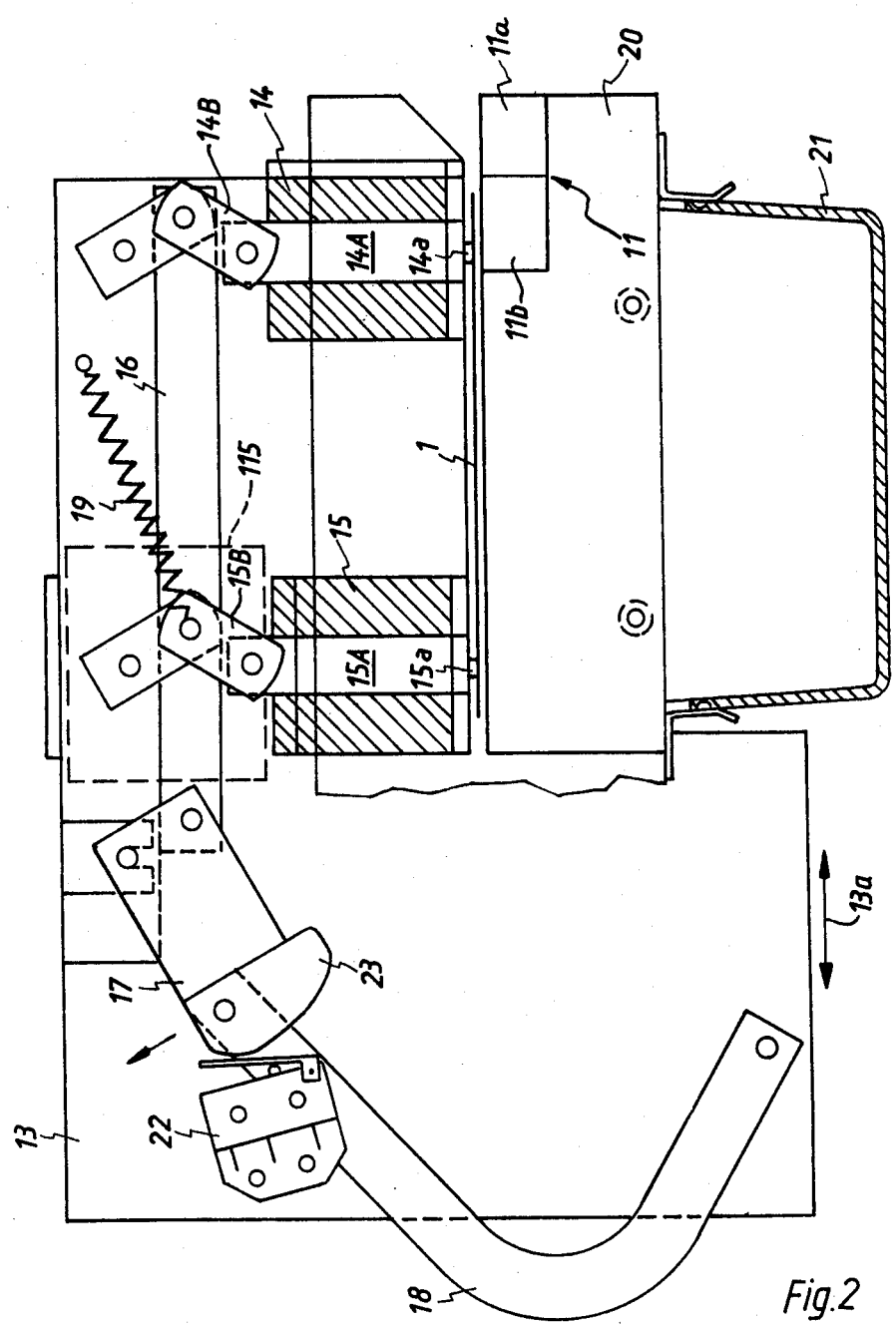
FIG. 2 is an enlarged partly elevational and partly sectional view of the two marker applying units in the apparatus of FIG. 1.

The carriage 13 for the units 11 and 12 of the assembly 10 is movable longitudinally and transversely of the direction of lengthwise movement of the web 1 (the double-headed arrow 13a shown in FIG. 2 denotes the direction of transverse movement of the carriage). The units 11 and 12 receive signals from the mechanical storage 8 (such signals are generated on detection of indicia which denote the last film frames of successive orders) and from a command unit 14 which transmits a signal during each copying cycle so that the web 1 is provided with markers which denote successive latent images or prints thereon. The command unit 14 can transmit a signal in response to each actuation of the transporting unit for the web 1. The extent to which the web 1 is advanced in a direction to the right, as viewed in FIG. 1, upon completion of a copying operation depends on the selected format of prints, i.e., on the setting of format selector 9. The exact length of each transporting step can be determined by a device for measuring the length of that portion of the web 1 which is being moved past a reference point in the path for the web 1, or by optical scanning of successive indicia of a row of indicia on the film 4.

Certain details of the assembly 10 are shown in FIG. 2. The unit 12 comprises two reciprocable marker applying devices or rams 14A, 15A which receive motion from discrete toggle joints 14B, 15B. The rams 14A, 15A are reciprocable in guides 14, 15 on the carriage 13 and carry punches 14a, 15a which respectively provide the web with first and second markers denoting successive prints (in response to signals from the command unit 14) and the last prints of successive orders (in response to signals from the storage 8). The toggle joints 14B, 15B can receive motion form a common connection rod 16 which causes the punch 14a to apply a first marker in response to each leftward movement of the rod 16 but causes the punch 15a to apply a second marker only when the toggle joint 15B is properly connected thereto by means of a coupling 115 (the details of such coupling form no part of the invention; this coupling is engaged only when the storage 8 transmits a signal denoting the last print of an order). For example, the coupling 115 can be engaged by the reciprocable armature of an electromagnet which is energized in response to a signal from the storage 8.

The connecting rod 16 receives motion from a link 17 which is articulately connected with the carriage 13 and with a lever 18. The lever 18 performs a predetermined movement during each copying cycle, e.g., in response to each actuation of the mechanism which transports the web 1 lengthwise. This lever can receive motion from the main shaft 27A (FIG. 3) of the copying machine. A helical spring 19 or another suitable biasing device serves to return the connecting rod 16 to its starting position upon completion of each copying cycle. Such movement of the connecting rod 16 results in automatic retraction of the punch 15a and/or 14a.

The punches 14a, 15a cooperate with an anvil or table 20 which is mounted on the carriage 13 at a level above a detachable receptacle 21 for removed portions of the web 1.

The anvil 20 supports a portion of or the entire unit 11 for exposing first and second markers on the photosensitive material of the web 1. The unit 11 is ready to expose markers in response to closing of an electric switch 22 which is mounted on the carriage 13 and can be closed by a cam-shaped trip or actuating member 23 on the link 17. The actuating member 23 can constitute an integral or removable part of the link 17 and closes the switch 22 to render the unit 11 operative when the link 17 is detached from the connecting rod 16 so that the unit 12 is inoperative when the unit 11 is ready to apply markers. The length of intervals during which the switch 22 is closed by the link 17 and the devices 11a, 11b of the unit 11 respectively expose first and second markers depends on the configuration of the lobe of the cam 23. The unit 11 may comprise two or more illuminating devices of known design one (e.g., 11b) of which applies a second marker whenever the unit 11 receives a signal from the storage 8 (whereby such second marker denotes the last print of an order) and the other (e.g., 11a) or others of which apply one or more identical or different first markers in response to each signal from the command unit 14 so that the web 1 is provided with markers which denote successive prints thereon.

The unit 12 preferably provides markers in the frame lines between successive prints on the web 1, and the unit 11 preferably provides markers in one marginal portion of the web 1. Thus, the carriage 13 must be capable of moving transversely (arrow 13a) and/or longitudinally of the web 1 for the purpose of selecting an appropriate format of prints (in response to adjustment of the selector 9), to place the punches 14a, 15a into proper positions to form markers in successive (punch 14a) or selected (punch 15a) frame lines of the web 1 (when the unit 11 is idle), or to place the unit 11 in proper position for the application of markers to a marginal portion of the web 1 (when the link 17 is detached from the rod 16 so that the unit 12 is idle). If the improved apparatus is to expose markers onto the frame lines between neighoring prints, the illuminating elements of the unit 11 are adjacent to the punches 14a, 15a and the carriage 13 moves lengthwise of the web 1 in order to place the punches 14a, 15a or the illuminating elements of the unit 11 into an optimum position for the making of markers in frame lines, depending upon whether the operator has decided to apply markers in the form of exposures (unit 11) or markers in the form of cutouts or slits (unit 12).

Figure 4:
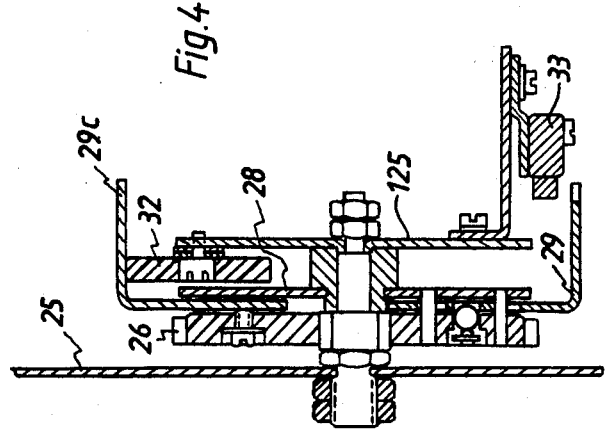
FIG. 4 is a sectional view of the storage, as seen in the direction of arrows from the line IV—IV of FIG. 3.
Figure 3:
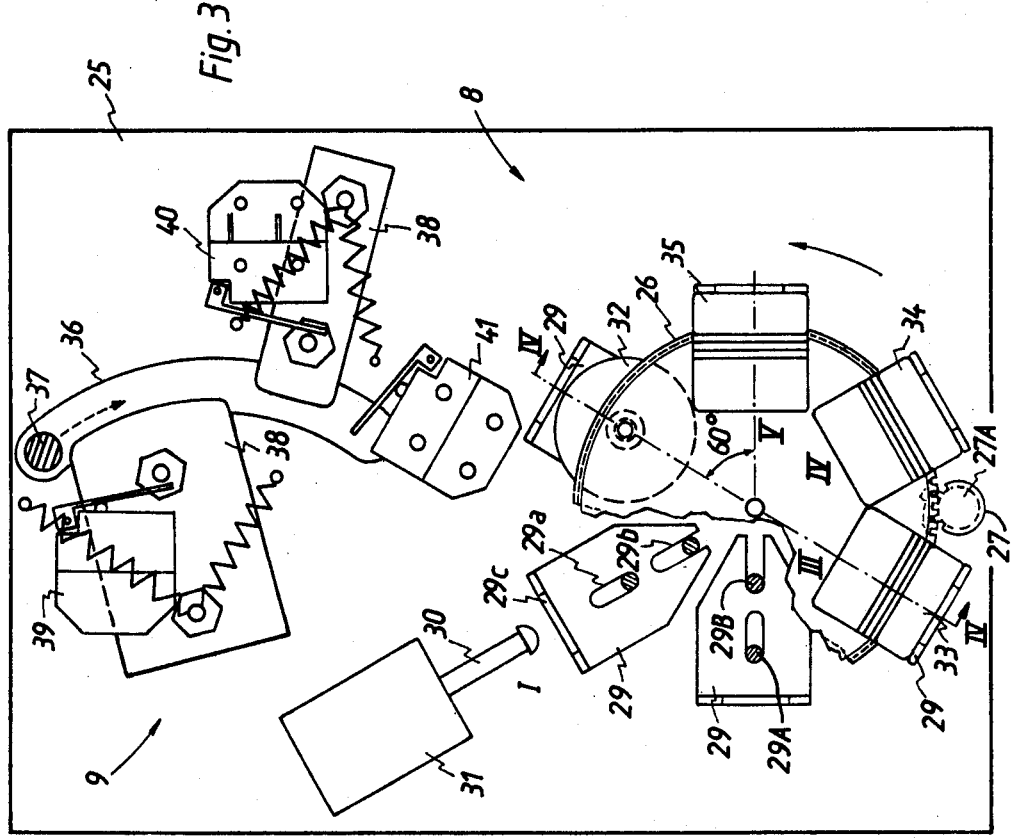
FIG. 3 is a plan view of the mechanical storage and format selector in the apparatus of FIG. 1.

Referring to FIGS. 3 and 4, the mechanical storage 8 is mounted on a base plate or carrier 25 which is installed in the frame or housing of the copying machine and supports a spur gear 26 or an analogous rotary member in mesh with a smaller gear or pinion 27 on the main shaft 27A of the copying machine. The main shaft 27A can be driven by a prime mover in such a way that it completes a single revolution during each copying cycle, and the transmission ratio of the gears 26, 27 may be such that the larger gear 26 turns through 60° in response to each revolution of the rotary member including the shaft 27A and smaller gear 27.

The gear 26 is rigid with and spaced apart from a coaxial disk 28 which supports six equally spaced signal storing elements here shown as cams or trips 29 each movable radially of the gear 26. The guide means for confining the cams 29 to radial movement relative to the gear 26 comprises pairs of aligned elongated slots 29a, 29b which are machined into the respective cams and extend radially of the gear 26, and pins 29A, 29B which are parallel to the axis of the gear 26, which extend through the respective slots 29a, 29b, and whose ends are secured to the gear 26 and disk 28. The cams 29 engage the respective pins 29A, 29B, the gear 26 and/or the disk 28 with sufficient friction to insure that each thereof normally remains in the inner or outer end position, i.e., that it is necessary to apply a certain force in order to move a cam from its inner end position to its outer end position or vice versa.

Each cam 29 has a bent-over outer end portion or lug 29c which can be engaged and moved radially toward the axis of the gear 26 by the reciprocable armature 30 of an electromagnet 31 on the base plate 25. A stationary frame member 125 supports a resetting wheel 32 which is rotatable about a fixed axis and is located in the path of movement of successive cams 29 upstream of the electromagnet 31. The distance between the resetting wheel 32 and the armature 30 of the electromagnet 31, as considered in the direction of (anticlockwise) rotation of the gear 26 in FIG. 3, equals 60°. The periphery of the wheel 32 cooperates with the inner sides of lugs 29c on successive cams 29 which assume their inner end positions and insures that such cams 29 are returned to their outer end positions prior to moving into the range of the armature 30 (which is retracted when the electromagnet 31 is deenergized).

The position of the armature 30 with respect to the path of movement of the cams 29 is called the position I and the gear 26 rotates the cams 29 in a counterclockwise direction, as viewed in FIG. 3. The positions III, IV and V are occupied by signal transmitting microswitches 33, 34 and 35 which are actuatable by a cam 29 when the latter moves past the respective position III, IV on V and assumes its inner end position. The microswitch 33, 34 or 35 thereby completes an electric circuit for the generation of a signal which is transmitted to the unit 11 or 12 for the application of a second marker denoting the last print of an order.

The base plate or carrier 25 further supports certain component parts of the aforementioned format selector 9. The selector 9 includes a selector member or lever 37 which is movable in an arcuate slot 36 of the base plate 25 into any one of three positions in two of which the lever 37 displaces a different cam or trip 38. The selected cam 38 thereby closes a signal transmitting microswitch 39 or 40. In its lower end position, as viewed in FIG. 3, the lever 37 directly engages and closes a third microswitch 41. The switches 39, 40, 41 determine the extent to which the transporting mechanism advances the web 1 between the making of successive exposures, i.e., these switches determine the size of prints. The lever 37 can be adjusted by hand or by remote control in response to depression of a corresponding button on the control panel (not shown) of the copying machine.

The operation:

The person in charge selects the desired format by adjusting the lever 37 with reference to the slot 36 of the base plate 25 and the desired type of markers by placing the unit 11 or 12 into an optimum position with reference to the path for the web 1. The latter adjustment is effected by moving the carriage 13 transversely and/or lengthwise of the web 1 and by disengaging the link 17 from the connecting rod 16 when the markers are to be applied by devices 11a, 11b of the unit 11. The lever 37 is preferably connected with the carriage 13 so that an appropriate adjustment of the lever 37 automatically results in movement of the carriage to an optimum position for the application of first and second markers by the unit 11 or 12, either to a marginal portion of the web 1 (by the light-emitting elements of the unit 11) or to successive frame lines of the web (by the punch 15a and/or 14a of the unit 12). If the user decides to select the stamping unit 12, the link 17 is coupled to and can transmit motion to the connecting rod 16. This preferably results in automatic disconnection of unit 11 from the energy source for the light-emitting elements. The lever 37 actuates the switch 41 or causes one of the cams or trips 38 to close the selected switch 39 or 40. The copying machine is then ready for use and the punch 14a applies a first marker to each frame line between two neighboring latent images on the web 1, i.e., between the freshly formed latent image and the latent image which is about to be formed on the photosensitive material of the web 1.

When the scanning device 7 detects an indicium on the film 4, i.e., when the device 7 transmits a signal which denotes the detection of the last film frame of an order, such signal is transmitted to the storage 8 and results in energization of the electromagnet 31. The latter moves the armature 30 toward the axis of the gear 26 and thereby moves the adjacent cam 29 from the outer end position to the inner end position. It will be recalled that the resetting wheel 32 automatically retracts each depressed cam 29 to the outer end position before such cam reaches the position I of FIG. 3. The freshly depressed cam 29 thereupon advances stepwise whereby each step corresponds to a discrete copying cycle. Thus, the depressed cam 29 can perform two, three or four steps before it reaches that switch (33, 34 or 35) which must be actuated in order to cause the punch 15a to apply a second marker which denotes the last print of an order. The switches 33, 34, 35 of the storage 8 are respectively associated with the switches 39, 40, 41 of the format selector 9 in such a way that they form three logic circuits (e.g., AND-gates). Thus, if the lever 37 of the format selector 9 closes the switch 41, the movement of a depressed cam 29 into engagement with the switch 33 or 34 does not result in the application of a second marker which denotes the last print of an order. Such marker will be applied only when the depressed cam 29 reaches the switch 35 which, together with the actuated switch 41, forms part of the appropriate logic circuit. If the lever 37 closes the switch 39 or 40 (by way of the corresponding trip 38), a depressed cam 29 will cause the punch 15a to form a second marker only when such depressed cam actuates the switch 33 or 34 of the storage 8.

The scanning device 7 monitors the film 4 at a fixed locus, e.g., at a locus which is located one film frame ahead of the light duct 5a. The application of a second marker which denotes the last print of an order takes place with a given delay subsequent to detection of the corresponding indicium on the film 4; such delay may be equal to that which is needed to complete two, three or four copying cycles. The delay depends on the selected format of prints on the web 1. The second marker which is applied by the punch 15a can be located between the first and second prints of the next-following order, depending on the nature of severing device which is used to subdivide the web 1 into discrete prints.

An important advantage of the improved apparatus is that, when the markers are applied by the unit 12, the material which is removed by the punch 14a or 15a is remote from the exposure station ES. Such mounting of the unit 12 facilitates the collection and removal of scrap and, secondly, the problem of vignetting of the punch 14a and/or 15a in the light beam does not arise at all.

Another important advantage of the improved apparatus is that the storage 8 invariably transmits a signal for the making of a second marker which denotes the last print of an order, and that the transmission of such signal takes place at an optimum time to insure that the corresponding second marker invariably denotes the last print of a given order. The lever 37 of the format selector 9 can adjust the carriage 13 simultaneously with appropriate adjustment of the storage 8 (activation of the switch 33, 34 or 35) so that the application of a second marker denoting the last print of an order takes place with the desired delay (two, three or four copying cycles) in dependency on selected format of the prints.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

What is claimed is:

1. In a copying machine, particularly in a projection printer, wherein a web of photographic material is moved along a predetermined path past an exposure station to be provided with latent images of portions of a movable original, wherein said portions of the original form groups of successive portions belonging to different orders, and wherein the original is provided with indicia denoting the last portions of successive orders, apparatus for applying to the web first markers which denote successive images and the locations where the web is to be severed to yield discrete prints, and second markers denoting the images corresponding to last portions of successive orders, said apparatus comprising a mobile support; first and second marker applying units mounted on said support, said first unit having first and second devices for respectively applying first and second markers of a first type and said second unit having first and second devices for respectively applying first and second markers of a second type, said support being adjustable relative to said path in accordance with the desired format of images; means for rendering a selected unit operative for the application of first and second markers by the corresponding first and second devices; means for monitoring the original for the presence of indicia and for producing signals in response to detection of successive indicia; and a mechanical storage having means for storing said signals and means for transmitting the thus stored signals to said second device of the selected unit with a predetermined delay.

2. Apparatus as defined in claim 1, wherein one of said units comprises first and second devices for exposing first and second markers on the photosensitive material of the web.

3. Apparatus as defined in claim 1, wherein one of said units comprises first and second devices for removing material from the web.

4. Apparatus as defined in claim 1, wherein said first and second units are located one behind the other, as considered in the direction of movement of the web, at a distance which equals or closely approximates the length of an image on the web.

5. Apparatus as defined in claim 4, wherein said support includes a carriage which is movable longitudinally of said path to place the selected unit in an optimum position with respect to the web in said path and to determine the desired format of images on the web.

6. Apparatus as defined in claim 1, wherein one of said units includes first and second devices for removing material from the web in said path and the first and second devices of said one unit respectively comprise first and second punches and first and second toggle joints actuatable to move the respective punches into material-removing engagement with the web, said means for rendering a selected unit operative comprising a coupling which is engageable by said storage to actuate the second toggle joint of said one unit.

7. Apparatus as defined in claim 6, wherein said one unit further comprises a motion transmitting member which is movable between first and second position to respectively move said punches into and from engagement with the web and means for moving said member in synchronism with operation of the copying machine.

8. Apparatus as defined in claim 7, wherein said means for moving said member includes a link which is detachable from said member to thereby render said one unit inoperative.

9. Apparatus as defined in claim 1, wherein said first unit includes first and second devices for exposing markers on the photosensitive material of the web and said second unit is a stamping unit having first and second devices which include punches and are movable into and from material-removing engagement with the web and an anvil for said punches, said first and second devices of said first unit being mounted on said anvil and said anvil being movable with said support lengthwise and transversely of said path.

10. Apparatus as defined in claim 1, wherein said first unit comprises first and second devices which expose first and second markers on the photosensitive material of the web in said path and said second unit comprises first and second devices which include first and second punches movable into and from material-removing engagement with the web in said path, said second unit further comprising means for moving said punches in synchronism with the operation of said copying machine and said moving means including a member movable between first and second positions in which said second unit is respectively operative and inoperative, said means for rendering a selected unit operative comprising a switch which is closed on movement of said member to said second position to thereby render said first unit operative for exposure of first and second markers on the web in said path.

11. Apparatus as defined in claim 10, wherein said member comprises a cam and the configuration of said cam determines the length of the interval during which at least one device of said first unit exposes a marker on the photosensitive material of the web in said path.

12. Apparatus as defined in claim 1, wherein said copying machine has a first rotary member and said storage further comprises a second rotary member which receives torque from said first rotary member during each cycle of said machine, said signal storing means comprising a plurality of trips mounted on said second rotary member and each movable between first and second positions, said storage further including means for moving one of said trips to said first position in response to a signal from said monitoring means on detection of an indicium on the original and said signal transmitting means of said storage comprising a plurality of discrete signal transmitting elements one of which is actuatable by the trip which assumes said first position to thereby transmit a signal to the second device of the selected unit, there being one signal transmitting element for each of the various formats of said images.

13. Apparatus as defined in claim 12, wherein said elements are electric switches and said delay equals the duration of intervals respectively corresponding to the duration of two, three of four cycles of the copying machine.

14. Apparatus as defined in claim 12, wherein said first rotary member includes a first gear and said second rotary member includes a second gear in mesh with said first gear.

15. Apparatus as defined in claim 12, wherein said means for moving one of said trips to first position comprises an electromagnet which is energized on detection of an indicium on the original.

16. Apparatus as defined in claim 12, wherein said rotary members together constitute a transmission with a ratio of six to one so that each revolution of said first member during a cycle of said machine entails rotation of said second member through an angle of 60°, said signal transmitting means comprising three discrete signal transmitting elements which are respectively offset with respect to said means for moving said one trip by 120°, 180° and 240°, as considered in the direction of rotation of said second rotary member.

17. Apparatus as defined in claim 12, further comprising a format selector having a selector member movable between a plurality of positions each corresponding to a different format of images on the web and a plurality of second signal transmitting elements, one for each position of said selector member and each actuated in the respective position of said selector member, each of said second signal transmitting elements being associated with one of said first mentioned signal transmitting elements and the trip which assumes said first position causing said second device of the selected unit to apply a second marker only when it actuates that first mentioned signal transmitting element which is associated with the actuated second signal transmitting element.

18. Apparatus as defined in claim 17, wherein each of said signal transmitting elements is a normally open switch.

19. Apparatus as defined in claim 18, wherein said first mentioned signal transmitting elements and the associated second signal transmitting elements form part of discrete logic circuits.

* * * * *